United States Patent [19]

Patten

[11] 4,431,922

[45] Feb. 14, 1984

[54] MIXED PHOSPHORS COMPRISING BOTH $GD_2O_2S$ AND $GDTAO_4$ AND X-RAY SCREENS THEREOF

[75] Inventor: Stanley H. Patten, Towanda, Pa.

[73] Assignee: E. I. Du Pont de Nemours and Company, Wilmington, Del.

[21] Appl. No.: 335,644

[22] Filed: Dec. 30, 1981

[51] Int. Cl.³ .................... C09K 11/475; G01T 1/00
[52] U.S. Cl. ........................ 250/486.1; 250/483.1; 252/301.4 R; 428/690
[58] Field of Search ............... 250/486.1, 483.1; 428/690; 252/301.4 R

[56] References Cited

U.S. PATENT DOCUMENTS

| | | | |
|---|---|---|---|
| 3,725,704 | 4/1973 | Buchanan et al. | 250/71 R |
| 3,738,856 | 6/1973 | Masi | 117/33.5 C |
| 3,895,157 | 7/1975 | Brixner et al. | 428/220 |
| 4,225,653 | 9/1980 | Brixner | 428/539 |
| 4,259,588 | 3/1981 | Luckey et al. | 250/483 |

Primary Examiner—Alfred E. Smith
Assistant Examiner—Grigsby T. N.

[57] ABSTRACT

An X-ray phosphor comprising a mixture of gadolinium oxysulfide and gadolinium tantalate, activated with trivalent terbium, is employed in X-ray conversion screens to convert X-rays to visible light, mostly in the green region of the spectrum.

5 Claims, 1 Drawing Figure

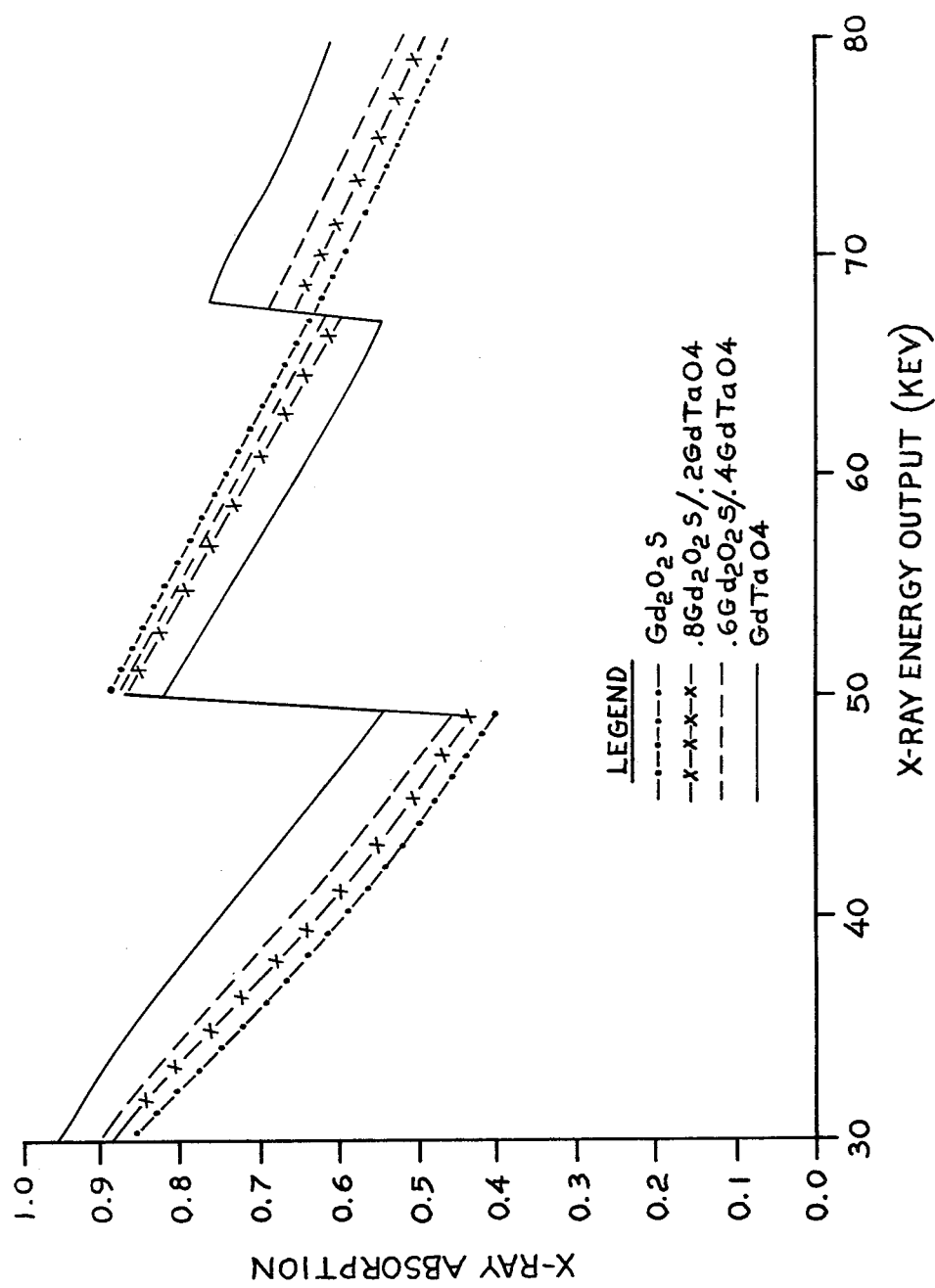

MIXED PHOSPHORS COMPRISING BOTH GD$_2$O$_2$S AND GDTAO$_4$ AND X-RAY SCREENS THEREOF

BACKGROUND OF THE INVENTION

Since shortly after the discovery of X-rays, an X-ray conversion screen, also called an X-ray intensifying screen, has been used to convert X-ray images to visible or near-visible images. The key constituent of an X-ray conversion screen is a phosphor material which absorbs incident X-ray photons and produces in their stead photons of visible or near-visible energy. Such screens are now used widely in industry and medicine. In use, the screen, mounted in a cassette, is placed directly in the X-ray beam and comes into immediate contact with a sheet of photosensitive film which is more sensitive to the light emitted by the phosphor screen than to the X-rays. Thus, an "intensified" image is produced on the film.

X-ray quality is commonly measured in terms of the voltage applied to the X-ray tube which generates the X-rays. For medical use, X-rays are produced at tube potentials of about 30–140 killivolts (kVp). When the phosphor contained in the X-ray screen is struck by X-rays, a certain amount of the energy of the X-radiation is absorbed by the phosphor. The amount of energy absorbed—i.e., the efficiency of the phosphor—will vary from phosphor to phosphor. Since the phosphor emits visible light (fluoresces) in proportion to the amount of X-ray energy absorbed, and since it is this visible light which exposes the photosensitive film, a highly efficient phosphor system is desirable. Also, X-rays are applied from the X-ray source at varying kilovoltage of output—known as the kVp spectrum. To be highly useful, an X-ray screen must respond adequately at the high and low ends of the kVp spectrum.

Thus, to be useful, the X-ray phosphor material must stop X-rays effectively and must convert efficiently the absorbed X-ray energy into light photons. Thus, the ideal phosphor material should have both a high X-ray absorption coefficient and a high X-ray conversion efficiency.

Using green-sensitive X-ray film, patient exposure can be reduced if all components of a phosphor mixture emit in the green (to which the film is most sensitive) as compared to a mixture in which one component emits blue (to which the film is not sensitive).

Three phosphors generally utilized in X-ray conversion screens are: calcium tungstate (CaWO$_4$), and cesium iodide (CsI), cadmium-zinc sulfide powders, typically (Cd$_{0.5}$Zn$_{0.5}$)S:Ag. The first two phosphors, however, have the disadvantage that they emit light principally in the blue region of the spectrum, and the third phosphor emits in the yellow-green.

U.S. Pat. No. 3,725,704 describes an X-ray conversion screen which employs a phosphor consisting essentially of at least one oxysulfide selected from the group consisting of lanthanum oxysulfide, gadolinium oxysulfide and lutetium oxysulfide, in which from about 0.005 percent to 8 percent of the host metal ions have been replaced by trivalent terbium ions. Conversion screens utilizing one of the phosphors of that invention, when placed in an X-ray beam, convert X-ray photons to radiation in the blue and green portion of the visible spectrum, principally in the green portion, between about 500 and 600 nm.

U.S. Pat. No. 3,738,856 is directed to an X-ray conversion screen which employs a phosphor consisting of, in one embodiment, a 95/5 mixture of gadolinium and yttrium oxysulfide, activated with terbium. An analogous phosphor, gadolinium tantalate activated with terbium, is disclosed in U.S. Pat. No. 4,225,653.

U.S. Pat. No. 4,259,588 teaches the use of an absorber, i.e., a yellow dye, mixed in with a green-emitting X-ray phosphor, e.g., terbium-activated gadolinium oxysulfide, in an X-ray intensifying screen. It is claimed that the yellow dye absorbs trace amounts of blue emission given off naturally by the phosphor, thus improving certain characteristics.

None of the above phosphor systems exhibit improved absorption over a broad range of the kVp system.

SUMMARY OF THE INVENTION

This invention provides a phosphor mixture having new and unobvious properties uniquely suited for use in X-ray conversion screens, this mixture consisting essentially of a major amount of gadolinium oxysulfide (Gd$_2$O$_2$S) and a minor amount (preferably 5 to 20 percent by weight of the mixture) of gadolinium tantalate (GdTaO$_4$), and wherein from about 0.005 percent to 8 percent of the host metal ions have been replaced by trivalent terbium (Tb) ions. These phosphor mixtures are mainly green-emitting, and exhibit excellent absorption over a broader range of the kVp spectrum than screens made from Gd$_2$O$_2$S:Tb per se. Specifically, these mixtures will absorb X-rays better than Gd$_2$O$_2$S:Tb at both low kVp (30–50) and high kVp (68–140). In a typical application, the X-ray conversion screen will consist essentially of the mixed phosphor, a binder for said phosphor, and a substrate for said phosphor and said binder.

The advantage of this invention rests primarily on improved X-ray absorption characteristics in the very low and very high kilovoltage regions. Speed performance is more linear and stable than a pure Gd$_2$O$_2$S:Tb screen. Choice of GdTaO$_4$:Tb as the adulterant is superior to other phosphors because its emission is more closely matched to the peak sensitivity of green film. In addition its morphology and density lead to improved phosphor dispersion compared to other phosphors, e.g., Y$_2$O$_2$S:Tb.

BRIEF DESCRIPTION OF THE DRAWING

The drawing shows the X-ray absorption of a phosphor of this invention compared to a prior art phosphor and plotted vs. the X-ray energy (keV) which is applied.

DETAILED DESCRIPTION OF THE INVENTION

Although phosphor materials useful in the manufacture of X-ray conversion screens are legion in number, it is not common to mix individual phosphors together for this purpose since the morphology, or crystal structure, of phosphors usually differ widely. Conventionally, in order to fabricate an X-ray conversion screen, the phosphor is made by mixing solutions or slurries of the individual ingredients or simply grinding the ingredients together, followed by a high temperature firing in various atmospheres (e.g., nitrogen, hydrogen, etc.) to achieve the desired result. The phosphor is then mixed with a suitable binder, coated on a support, and dried. An overcoat may also be applied to protect the product during use and to add to the usable life of the finished X-ray conversion screen.

In the practice of this invention the individual phosphors, after having been made as taught in the prior art (e.g., U.S. Pat. No. 4,225,653 in the case of $GdTaO_4$:Tb and U.S. Pat. No. 3,725,704 in the case of $Gd_2O_2S$:Tb) are mixed individually with an appropriate solvent (e.g., butyl acetate) in a binder (e.g., polyvinylbutyral) to form a suspension. Portions of each of these suspensions are then mixed in the desired amount and are coated in a conventional manner on a typical support (e.g., polyethylene terephthalate). A reflective layer, for example, $TiO_2$ mixed in a suitable binder, may be interposed between the support and the phosphor layer. A protective layer may also be coated on top of the phosphor layer.

The composite preferred structure contains, in order, a support, a reflective layer, a fluorescent layer containing the mixed phosphors of this invention, and a protective layer. This structure is eminently useful as an X-ray conversion screen when used with green-sensitive X-ray film, because of (1) improved absorption of X-radiation by the mixed phosphor, and (2) the improved output (emission) of green light. Whereas U.S. Pat. No. 4,259,588, supra, teaches the use of dyes and the like to absorb unwanted blue emission from $Gd_2O_2S$:Tb, in the present invention it is unnecessary to add absorbing materials which may tend to reduce the screen output. This discovery itself is unusual since it was unexpected that the addition of the gadolinium tantalate would have any effect on the blue emission of the gadolinium oxysulfide.

In a typical X-ray intensifying screen, the powdered, mixed phosphor composition of this invention is adhered to a flexible support such as cardboard or polyester film in a thin layer by means of a suitable binder. The phosphor/binder composition can conventionally contain 85% to about 96% of the phosphor, by weight. The phosphor layer is typically coated onto the support at a wet thickness of about 0.005 inch (0.0127 cm) to about 0.05 inch (0.127 cm). Dispersion of the phosphor in any one of a legion of conventional binders can be accomplished by ball-milling and by other procedures well known in the prior art, for example, U.S. Pat. Nos. 2,648,013; 2,819,183; 2,987,882; 3,043,710; and 3,895,157. Conventional supports which can be used include cardboard, suitably sized or coated, for example, with baryta; cellulose acetate, cellulose propionate, cellulose acetate propionate, cellulose acetate butyrate; poly(vinyl chloride or vinyl acetate); polyamides; metal sheeting, for example aluminum; and poly(ethylene terephthalate), the latter being a preferred support. For use as an X-ray screen, the support must be permeable to X-rays. A thickness of about 0.00025 inch (0.00064 cm) to about 0.30 inch (0.76 cm) is adequate for these supports, with thicknesses of about 0.01 inch (0.025 cm) being preferred.

Referring to the drawing, which plots X-ray energy (KEV) vs. Absorption of several phosphors, the prior art phosphors are shown as $GdTaO_4$ (gadolinium tantalate-terbium activated) and $Gd_2O_2S$ (gadolinium oxysulfide-terbium activated). Two mixtures of this invention are shown as $0.6Gd_2O_2S/0.4GdTaO_4$ and $0.8Gd_2O_2S/0.2GdTaO_4$. The $GdTaO_4$ alone (solid line) has high absorption at the low end and the high end of the energy spectrum but lower output in the middle. The $Gd_2O_2S$ alone has lower absorption at both ends of the energy spectrum and good absorption in the middle. The mixture of phosphors has good absorption throughout the entire energy spectrum.

This invention will now be illustrated by the following example.

EXAMPLE

The following solvent mixture was prepared:

| Ingredient | Amt. (g.) |
| --- | --- |
| n-propanol | 1260 |
| n-butyl acetate | 1260 |
| 2% silicone solution[1] | 248 |
| Potassium salt of monoethylphenyl phenol monosulfonic acid | 66 |
| Glycerol monolaurate | 413 |

[1]Polymeric organic silicone fluid, 2% by wt. in toluene; sp. gr. 0.964.9.969/20° C.; viscosity at 25° C., 4 to 40 centistokes determined with an Ostwald viscosimeter The following phosphor compositions were also prepared:

| Ingredient | | Comp. A (Amt. in g.) | Comp. B |
| --- | --- | --- | --- |
| Phosphor | $GdTaO_4$-Tb (See Ex. 22, U.S. Pat. No. 4,225,653) | 600 | — |
| | $Gd_2O_2S$-Tb (from General Electric Co.) | — | 400 |
| Binder | 13.3% poly(vinylbutyral) acetate soln. | 293 | — |
| | 18.8% poly(vinylbutyral) in butyl acetate soln. | — | 1332 |
| Solvent mixture from above | | 472 | |

Composition A was ball-milled for 6 hours and then filtered. Composition B was prepared by wetting the phosphor with the solvent mixture, adding the binder and then rolling for ca. 12 hours followed by filtering.

Mixtures of Composition A and Composition B were prepared as follows:

| | Mixtures (wt. in g.) | | | |
| --- | --- | --- | --- | --- |
| | 1 | 2 | 3 | 4 |
| Composition A | — | 43 | 82 | 149 |
| Composition B | 800 | 828 | 791 | 725 |
| $Gd_2O_2S/GdTaO_4$ Ratio | 100/0 | 95/5 | 90/10 | 80/20 |

X-ray intensifying screens were prepared from each of these mixtures by coating on a poly(ethylene terephthalate) support about 10 mils thick on which had been coated the reflective layer described in Ex. 1 of Brixner et al., U.S. Pat. No. 3,895,157, of which column 3, lines 35-66 are hereby incorporated by reference. The phosphor mixture was applied at a wet thickness of ca. 40 mils and overcoated with a cellulose acetate protective coat solution (see the above Brixner et al. reference) at a wet coating thickness of 20-26. The coated screens were then dried for about 12 hours at about 70° C. All of these screen-making techniques are conventional and do not bear on the essence of this invention.

Each of these screens was used to expose a test target on a double side coated sheet of green-sensitive X-ray photographic silver halide film, i.e., one which had been emulsion-coated on both sides of the film support, using an X-ray source at 80 kVp and 10 ma through 1½ mm aluminum and ½ mm copper foils. Exposure was made with two samples of each screen, one for each side of the film. The film and screens were placed in an X-ray cassette to insure good film/screen contact and placed at a distance of about 55 inch (139.7 cm) from the X-ray source. The following results were obtained:

| Mixture No. | Ratio | Relative Speed | Resolution (L/mm) |
|---|---|---|---|
| 1 | 100/0 | 100 | 4.00 |
| 2 | 95/5 | 98.5 | 4.13 |
| 3 | 90/10 | 95.5 | 4.09 |
| 4 | 80/20 | 92.2 | 4.00 |

Four samples of screens prepared using Mixture 3 (90/10 ratio) were also exposed at varying kVp to identical test targets and identical green-sensitive X-ray films with the following results:

| Sample | Relative Speed at Fol. kVp | | | |
|---|---|---|---|---|
| | 60 | 80 | 100 | 120 |
| 90/10 Mixt. | 98 | 103 | 106 | 107 |

The above results show that at the higher end of the energy spectrum (60-120 kVp) the 90/10 mixture has excellent speed stability. Screens with 100% $Gd_2O_2S$ did not possess this speed maintenance.

The green-sensitive X-ray film used in this example was prepared from a mixture of two emulsions of about $1.0\mu^3$ (ca. 65%) grain size and about $0.3\mu^3$ (ca. 35%) grain size. These emulsions are ca. 98% AgBr and ca. 2% AgI. The emulsion mixture contained about 140 g gelatin per 1.5 mole of silver halide and was sensitized with organic sulfur and gold thiocyanate and contained the usual hardeners, wetting agents, coating aids and antifoggants as well as a conventional merocyanine sensitizing dye to impart orthochromatic sensitivity thereto. The emulsion was coated on either side of a dimensionally stabilized blue tinted polyethylene terephthalate film support of about 0.0076 in. (0.019 cm) in thickness suitably subbed with a resin sub on each side, over which was applied a thin coating of gelatin. The coating weight on each side was about 3.4 g silver/m$^2$ and a hardened gelatin super coat was coated contiguous to each emulsion layer.

I claim:

1. An X-ray conversion screen consisting essentially of a mixed phosphor, a binder for said phosphor, and a substrate for said phosphor and said binder, said mixed phosphor consisting essentially of a major amount of gadolinium oxysulfide and a minor amount of gadolinium tantalate, and wherein from about 0.005 percent to 8 percent of the host metal ions have been replaced by trivalent terbium ions.

2. The X-ray conversion screen of claim 1 wherein said mixed phosphor contains 5-20% by weight of gadolinium tantalate.

3. A mixed phosphor consisting essentially of a major amount of gadolinium oxysulfide and a minor amount of gadolinium tantalate, and wherein from about 0.005 percent to 8 percent of the host metal ions have been replaced by trivalent terbium ions.

4. The mixed phosphor of claim 3 wherein the gadolinium tantalate makes up 5-20% by weight of the mixture.

5. A combination of the X-ray conversion screen of claim 1 or 2 with a green-sensitized silver halide emulsion photographic film.

* * * * *